(12) United States Patent
Zeng et al.

(10) Patent No.: US 12,058,607 B2
(45) Date of Patent: Aug. 6, 2024

(54) PRACH RESOURCE SELECTION METHOD AND APPARATUS

(71) Applicant: Huawei Technologies Co., Ltd., Shenzhen (CN)

(72) Inventors: Yongbo Zeng, Shenzhen (CN); Haibo Xu, Beijing (CN); Hui Jin, Beijing (CN); Le Jin, Shanghai (CN); Zhiqiang Song, Chengdu (CN); Huiyun Dong, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 467 days.

(21) Appl. No.: 17/298,399

(22) PCT Filed: Nov. 20, 2019

(86) PCT No.: PCT/CN2019/119569
§ 371 (c)(1),
(2) Date: May 28, 2021

(87) PCT Pub. No.: WO2020/108355
PCT Pub. Date: Jun. 4, 2020

(65) Prior Publication Data
US 2022/0060974 A1 Feb. 24, 2022

(30) Foreign Application Priority Data
Nov. 29, 2018 (CN) .......................... 201811444228.4

(51) Int. Cl.
*H04W 4/00* (2018.01)
*H04W 48/16* (2009.01)
(Continued)

(52) U.S. Cl.
CPC ........... *H04W 48/16* (2013.01); *H04W 48/20* (2013.01); *H04W 74/0833* (2013.01)

(58) Field of Classification Search
CPC ................................................ H04W 74/0833
See application file for complete search history.

(56) References Cited

U.S. PATENT DOCUMENTS

2015/0351058 A1 12/2015 Seo
2017/0367120 A1* 12/2017 Murray ............. H04W 74/0833
(Continued)

FOREIGN PATENT DOCUMENTS

CA 3105386 A1 * 2/2020 ............ H03M 13/15
CA 3113871 A1 * 2/2020 .......... H04W 74/002
(Continued)

OTHER PUBLICATIONS

R1-1712066, ZTE, "Power control during random access procedure," 3GPP TSG RAN WG1 Meeting #90, Prague, Czechia, Aug. 21-25, 2017, XP051314886, 4 pages.
(Continued)

*Primary Examiner* — Elisabeth Benoit Magloire
(74) *Attorney, Agent, or Firm* — Conley Rose, P.C.

(57) ABSTRACT

A Physical Random Access Channel (PRACH) resource selection method includes a terminal device receiving N synchronization signal blocks (SSBs) from an access device, determining a target PRACH resource selection manner based on at least one of a service type, a type of a trigger event that triggers random access, a signal strength change status of a reference signal received by the terminal device, mobility of the terminal device, and historical information, and selecting, in the determined selection manner, a target PRACH resource from N PRACH resources corresponding to the N SSBs.

30 Claims, 4 Drawing Sheets

(51) Int. Cl.
*H04W 48/20* (2009.01)
*H04W 74/0833* (2024.01)

(56) References Cited

U.S. PATENT DOCUMENTS

| | | | |
|---|---|---|---|
| 2018/0302889 A1 | 10/2018 | Guo et al. | |
| 2018/0332520 A1* | 11/2018 | Cheng | H04W 74/0891 |
| 2019/0215706 A1* | 7/2019 | Tsai | H04W 24/04 |
| 2020/0154377 A1 | 5/2020 | Qian et al. | |
| 2021/0274562 A1* | 9/2021 | Takeda | H04W 74/002 |
| 2021/0352734 A1* | 11/2021 | Svedman | H04W 72/1263 |
| 2022/0110160 A1* | 4/2022 | Takeda | H04L 5/0053 |

FOREIGN PATENT DOCUMENTS

| | | | | |
|---|---|---|---|---|
| CN | 104871613 A | | 8/2015 | |
| CN | 108040365 A | | 5/2018 | |
| CN | 108234005 A | | 6/2018 | |
| CN | 108809602 A | | 11/2018 | |
| CN | 109511156 A | | 3/2019 | |
| EP | 3206451 A1 | | 8/2017 | |
| GB | 2502128 A | * | 11/2013 | H04W 72/02 |
| WO | 2018182385 A1 | | 10/2018 | |

OTHER PUBLICATIONS

R1-1713381, Qualcomm Incorporated, "Power Ramping and Power Control for RACH Procedure," 3GPP TSG-RAN WGl Meeting #90 Prague, Czech Republic, Aug. 21-25, 2017, XP051316186, 7 pages.
R1-1714216, Motorola Mobility et al, "RACH resource configuration and selection," 3GPP TSG RAN WG1 Meeting #90, Prague, Czech Republic, Aug. 21-25, 2017, XP051317004, 3 pages.
"3rd Generation Partnership Project, Technical Specification Group Radio Access Network; NR; Requirements for support of radio resource management (Release 15)," 3GPP TS 38.133 V15.3.0, Sep. 2018, 136 pages.
"3rd Generation Partnership Project; Technical Specification Group Radio Access Network; NR, Physical channels and modulation (Release 15)," 3GPP TS 38.211 V15.3.0, Sep. 2018, 96 pages.
"3rd Generation Partnership Project; Technical Specification Group Radio Access Network; NR, Medium Access Control (MAC) protocol specification (Release 15)," 3GPP TS 38.321 V15.3.0, Sep. 2018, 76 pages.
"3rd Generation Partnership Project; Technical Specification Group Radio Access Network; NR, Radio Resource Control (RRC) protocol specification (Release 15)," 3GPP TS 38.331 V15.3.0, Sep. 2018, 445 pages.
"3rd Generation Partnership Project; Technical Specification Group Radio Access Network; NR, Physical layer procedures for control (Release 15)," 3GPP TS 38.213 V15.3.0, Sep. 2018, 101 pages.
Fujitsu, "Discussion on power ramping and power control during RA procedure," 3GPP TSG RAN WG1 Meeting #90, R1-1712734, Prague, Czech Republic, Aug. 21-25, 2017, 3 pages.
Qualcomm Incorporated, "CR on random access resource selection in case of poor RSRP conditions," 3GPP TSG-RAN WG2 Meeting NR ad-hoc #1, R2-1801445, Vancouver, Canada, Jan. 22-26, 2018, 4 pages.
Huawei, et al., "Correction in 38321 for BeamFailureRecoveryTimer," 3GPP TSG-RAN WG2 Meeting 102, R2-1807972, Busan, South Korea, May 21-25, 2018, 9 pages.
Huawei, et al., "Further discussion on beam reselection in RACH procedure," 3GPP TSG-RAN2 Meeting # AH 201807, Montreal, Canada, Jul. 2-6, 2018, R2-1810581, Revision of R2-1808470, 3 pages.

\* cited by examiner

PRACH RESOURCE SELECTION METHOD AND APPARATUS

CROSS-REFERENCE TO RELATED APPLICATIONS

This application is a U.S. national stage of International Patent Application No. PCT/CN2019/119569 filed on Nov. 20, 2019, which claims priority to Chinese Patent Application No. 201811444228.4 filed on Nov. 29, 2018. Both of the aforementioned applications are hereby incorporated by reference in their entireties.

TECHNICAL FIELD

This application relates to the communications field, and in particular, to a physical random access channel (physical random access channel, PRACH) resource selection method and an apparatus.

BACKGROUND

In a synchronization process of a 5G new radio (new radio, NR) system, to support a multi-beam operation, a base station may send beams of synchronization signals in different directions, so that terminal devices at different locations can use different beams as receive beams, and can further determine appropriate serving cells and appropriate transmit beams. In a current standard, when selecting a receive beam of a synchronization signal block (synchronization signal block, SSB), a terminal device mainly depends on a reference signal received power (reference signal received power, RSRP) of the SSB. If RSRPs of a plurality of received SSBs all exceed an RSRP threshold, the terminal device may randomly select an SSB from the plurality of SSBs that meet the RSRP threshold. If none of the plurality of SSBs meets the RSRP threshold, the terminal device may select any SSB.

In addition, each SSB is associated with one PRACH resource (the base station configures an association relationship between the SSB and the PRACH resource to the terminal device). When the terminal device selects an SSB, a PRACH resource used to send a random access preamble (random access preamble) (that is, a message 1 (Message 1, Msg.1)) in a random access process of the terminal device is also determined. After sending the Msg.1, the terminal device needs to monitor and receive, within a specified time window, a random access response (random access response, RAR) sent by the base station. The time window is referred to as an RAR window (RAR Window). Actually, a start time of the RAR window is a moment after the terminal device sends the random access preamble. In other words, a time location of the PRACH resource directly affects the start time of the RAR window, and further affects a latency of the random access process.

However, according to the foregoing method for selecting an SSB and then determining a corresponding PRACH, a time location of a PRACH resource corresponding to a finally selected SSB may be early or late, and an RSRP of the SSB may be high or low. Because different services have different latency and RSRP requirements, a service requirement possibly cannot be met due to randomness of the existing method.

SUMMARY

This application provides a PRACH resource selection method and an apparatus, to resolve a problem that a service requirement cannot be met in the prior art.

According to a first aspect, this application provides a PRACH resource selection method. A terminal device receives N synchronization signal blocks SSBs from an access device, then determines a target PRACH resource selection manner based on at least one of a service type, a type of a trigger event that triggers random access, a signal strength change status of a reference signal received by the terminal device, mobility of the terminal device, and historical information, and selects, in the determined selection manner, a target PRACH resource from N PRACH resources corresponding to the N SSBs. N is an integer greater than 1.

According to the foregoing method, the terminal device may select an appropriate PRACH resource with reference to an actual situation, to meet a service requirement.

In a possible design, a specific method for determining, by the terminal device, a target PRACH resource selection manner may be: When a service type of a service currently processed by the terminal device is a latency-insensitive service type, or a type of a trigger event that currently triggers random access is a low-priority trigger event type, or a change rate at which a signal strength of a reference signal received by the terminal device decreases within a specified time period is less than a specified change rate threshold (the change rate is an absolute value), or mobility of the terminal device is low mobility, or historical information obtained by the terminal device indicates a non-congestion. status of a network, the terminal device may determine, in the N SSBs, an SSB whose signal received power RSRP is the highest; and determine, based on a mapping relationship between an SSB and a PRACH resource, a PRACH resource corresponding to the SSB whose RSRP is the highest as the target PRACH resource.

According to the foregoing method, the terminal device can select a relatively good SSB, and then select a relatively good serving cell, thereby ensuring smooth progress of a service.

In a possible design, a specific method for determining, by the terminal device, a target PRACH resource selection manner may be: When a service type of a service currently processed by the terminal device is a latency-sensitive service type, or a type of a trigger event that currently triggers random access is a high-priority trigger event type, or a change rate at which a signal strength of a reference signal received by the terminal device decreases within a specified time period is greater than a specified change rate threshold (the change rate is an absolute value), or mobility of the terminal device is high mobility, or historical information obtained by the terminal device indicates a congestion status of a network, the terminal device may select, from the N SSBs, M SSBs whose RSRPs are greater than a specified threshold, and determine, based on a mapping relationship between an SSB and a PRACH resource, M PRACH resources corresponding to the M SSBs; and determine, in the M PRACH resources, a PRACH resource whose time location is the earliest as the target PRACH resource. M is a positive integer less than or equal to N.

According to the foregoing method, the terminal device selects a PRACH resource with an earlier location, so that a random access process can be quickly completed subsequently, thereby reducing a random access latency.

In a possible design, after selecting the target PRACH resource, the terminal device may further determine an SSB corresponding to the target PRACH resource. In this way, the terminal device can determine a serving cell to be finally selected.

In a possible design, after selecting the target PRACH resource, the terminal device may further send a random access preamble to the access device on the target PRACH resource. In this way, the terminal device can access the access device through a random access procedure, and subsequently can perform a service.

According to a second aspect, this application provides a PRACH resource selection method. After receiving N synchronization signal blocks SSBs from an access device, a terminal device determines, in the N SSBs, an SSB whose signal received power RSRP is the highest; and determines, based on a mapping relationship between an SSB and a PRACH resource, a PRACH resource corresponding to the SSB whose RSRP is the highest as a target PRACH resource. N is an integer greater than 1.

According to the foregoing method, the terminal device can select an appropriate SSB and a target PRACH resource based on a requirement of the terminal device, thereby meeting a service requirement.

In a possible design, before determining, in the N SSBs, the SSB whose RSRP is the highest, the terminal device may further determine that at least one of the following conditions is met: a service type of a currently processed service is a latency-insensitive service type; a type of a trigger event that currently triggers random access is a low-priority trigger event type; a change rate at which a signal strength of a reference signal received by the terminal device decreases within a specified time period is less than a specified change rate threshold (the change rate is an absolute value); mobility of the terminal device is low mobility; and historical information obtained by the terminal device indicates a non-congestion status of a network.

According to the foregoing method, the terminal device can subsequently select a relatively good SSB, and then select a relatively good serving cell, thereby ensuring smooth progress of a service.

According to a third aspect, this application provides a PRACH resource selection method. After receiving N synchronization signal blocks SSBs from an access device, a terminal device selects, from the N SSBs, M SSBs whose signal received powers RSRPs are greater than a specified threshold, determines, based on a mapping relationship between an SSB and a PRACH resource, M PRACH resources corresponding to the M SSBs, and determines, in the M PRACH resources, a PRACH resource whose time location is the earliest as a target PRACH resource. N is an integer greater than 1. M is a positive integer less than or equal to N.

According to the foregoing method, the terminal device can subsequently quickly complete a random access process, thereby reducing a random access latency, and further meeting a service requirement.

In a possible design, before selecting the M SSBs from the N SSBs, the terminal device may further determine that at least one of the following conditions is met: a service type of a currently processed service is a latency-sensitive service type; a type of a trigger event that currently triggers random access is a high-priority trigger event type; a change rate at which a signal strength of a reference signal received by the terminal device decreases within a specified time period is greater than a specified change rate threshold (the change rate is an absolute value); mobility of the terminal device is high mobility; and historical information obtained by the terminal device indicates a network congestion status of a network.

According to the foregoing method, the terminal device can subsequently select a PRACH resource whose time location is the earliest, and can subsequently quickly complete a random access process, thereby reducing a random access latency.

According to a fourth aspect, this application further provides a terminal device. The terminal device has a function of implementing the terminal device in the method in the first aspect, or a function of implementing the terminal device in the method in the second aspect, or a function of implementing the terminal device in the method in the third aspect. The function may be implemented by using hardware, or may be implemented by using hardware executing corresponding software. The hardware or the software includes one or more modules corresponding to the foregoing function.

In a possible design, a structure of the terminal device includes a transceiver unit and a processing unit. These units may perform corresponding functions in the foregoing method examples. For details, refer to detailed descriptions in the method example in the first aspect, the method example in the second aspect, or the method example in the third aspect. Details are not described herein again.

In a possible design, a structure of the terminal device includes a transceiver and a processor, and optionally may further include a memory. The transceiver is configured to receive and send information, and communicate and interact with another device in a communications system. The processor is configured to support the terminal device in performing a corresponding function in the method in the first aspect, the method in the second aspect, or the method in the third aspect. The memory is coupled to the processor, and stores program instructions and data that are necessary for the terminal device.

According to a fifth aspect, this application further provides a communications system. The communications system includes the access device and the terminal device that are mentioned in the foregoing designs.

According to a sixth aspect, this application further provides a computer storage medium. The computer storage medium stores computer executable instructions. When invoked by the computer, the computer executable instructions are used to enable the computer to perform any one of the methods mentioned above.

According to a seventh aspect, this application further provides a computer program product including instructions. When the computer program product is run on a computer, the computer is enabled to perform any one of the methods mentioned above.

According to an eighth aspect, this application further provides a chip. The chip is connected to a memory, and is configured to read and execute program instructions stored in the memory, to implement any one of the methods mentioned above.

DESCRIPTION OF EMBODIMENTS

Figure 1:
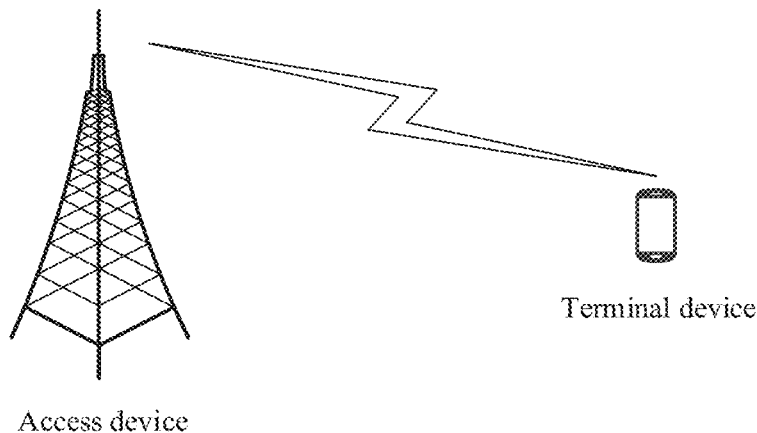
FIG. 1 is a schematic diagram of an architecture of a communications system according to this application.

The following further describes in detail this application with reference to accompanying drawings.

Embodiments of this application provide a PRACH resource selection method and an apparatus, to resolve a problem that a service requirement cannot be met in the prior art. The method and the apparatus in this application are based on a same inventive concept. Because problem-resolving principles of the method and the apparatus are similar, mutual reference may be made to implementations of the apparatus and the method, and repeated details are not described again.

In the following, some terms in this application are described, so as to help persons skilled in the art have a better understanding.

(1) A terminal device may also be referred to as user equipment (user equipment, UE), a mobile station (mobile station, MS), a mobile terminal (mobile terminal, MT), an interact of things terminal, or the like, and is a device that provides voice and/or data connectivity for a user. For example, the terminal device may include a handheld device having a wireless connection function, a vehicle-mounted device, a computing device, a mobile station (mobile station, MS), another processing device connected to a wireless modem, or a mobile terminal that communicates with one or more core networks by using an access network. Currently, the terminal device may be a mobile phone (mobile phone), a tablet computer, a notebook computer, a palmtop computer, an automobile, a mobile internet device (mobile internet device, MID), a wearable device, a virtual reality (virtual reality, VR) device, an augmented reality (augmented reality, AR) device, a wireless terminal in industrial control (industrial control), a wireless terminal in self-driving (self-driving), a wireless terminal in remote surgery (remote medical surgery), a wireless terminal in a smart grid (smart grid), a wireless terminal in transportation safety (transportation safety), a wireless terminal in a smart city (smart city), a wireless terminal in smart home (smart home), or the like.

(2) An access device is a device that provides a radio access service for a terminal device. The access device may be a base station, for example, a base station in 4G, a base station in 5G, or a subsequent base station that supports a 3GPP protocol release. The base station includes but is not limited to an evolved NodeB (evolved NodeB, eNB), a 5G gNodeB (gNodeB, gNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (base band unit, BBU), an access point (access point, AP), a radio access point (wireless fidelity access point, Wi-Fi AP), a worldwide interoperability for microwave access (worldwide interoperability for microwave access, WiMAX) BS, or the like. It should be noted that the access device may also be referred to as a network side device, and may provide a function of a protocol of at least one layer in a physical layer to an application layer in a 3GPP protocol structure.

(3) "A plurality of" refers to two or more than two.

To describe the technical solutions in the embodiments of this application more clearly, the PRACH resource selection method and the apparatus provided in the embodiments of this application are described in detail below with reference to the accompanying drawings.

FIG. 1 shows an architecture of a possible communications system to which a PRACH resource selection method according to the embodiments of this application is applicable. The architecture of the communications system includes an access device and a terminal device. The access device is responsible for providing a radio access-related service for the terminal device, to implement a radio physical layer function, resource scheduling, radio resource management, quality of service (quality of service, QoS) management, radio access control, a mobility management function, and the like. The terminal device is configured to perform a service by accessing the access device to which a cell in which the terminal device is located belongs.

Specifically, the access device sends beams of SSBs in different directions, so that terminal devices at different locations can use different beams as receive beams, and can further determine appropriate serving cells and appropriate transmit beams. The access device configures a corresponding PRACH resource for each SSB. The terminal device finally selects an SSB and a PRACH resource that correspond to each other, and sends a random access preamble on the selected PRACH resource.

It should be noted that the communications system shown in FIG. 1 is merely used as an example, and is not limited to including the access device and the terminal device shown in FIG. 1. The communications system may further include a plurality of access devices, a plurality of terminal devices, and other devices. Details are not described herein.

Figure 2:
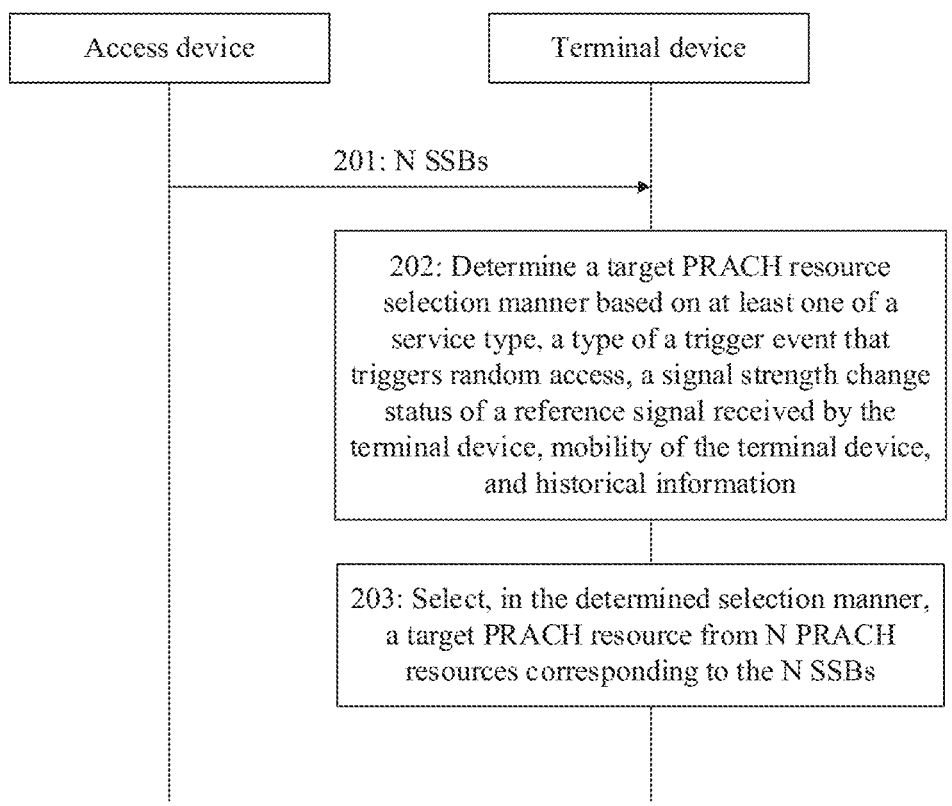
FIG. 2 is a flowchart of a PRACH resource selection method according to this application.

The PRACH resource selection method provided in the embodiments of this application is applicable to the communications system shown in FIG. 1. As shown in FIG. 2, a specific procedure of the method includes the following steps.

Step 201: The terminal device receives N SSBs from the access device, where N is an integer greater than 1.

In a specific implementation, the access device sends SSBs in different directions, so that the terminal device selects an SSB that meets a requirement of the terminal device. In other words, the terminal device receives a plurality of SSBs from the access device. Herein, the plurality of SSBs are denoted as the N SSBs.

Step 202: The terminal device determines a target PRACH resource selection manner based on at least one of a service type, a type of a trigger event that triggers random access, a signal strength change status of a reference signal received by the terminal device, mobility of the terminal device, and historical information.

In an optional implementation, the service type may be a latency-insensitive service type (for example, a video on demand service or a background cache service) or a latency-sensitive service type (for example, a voice service or an online game). The type of the trigger event that triggers random access may be a low-priority trigger event type (for example, a trigger event for loss of uplink synchronization) or a high-priority trigger event type (for example, a handover event or a beam failure (beam failure) event). The signal strength change status of the reference signal received by the terminal device may be as follows: A change rate at which the signal strength of the reference signal received by the terminal device decreases within a specified time period is less than a specified change rate threshold (that is, the signal strength decreases slowly, and the change rate is an absolute value). Alternatively, a change rate at which the signal strength of the reference signal received by the terminal device decreases within a specified time period is greater than a specified change rate threshold (that is, the signal strength decreases rapidly, and the change rate is an absolute value). A change in the signal strength of the reference signal received by the terminal device may be represented by a change in a reference signal received power. For example, the signal strength change status of the reference signal may be that the RSRP decreases at a high rate or the RSRP decreases at a low rate. The reference signal may be an SSB, a channel state information reference signal (channel state information-reference signal, CSI-RS), or another reference signal defined in a standard. The mobility of the terminal device is low mobility or high mobility. The historical information (which may include historical network information) may indicate a non-congestion status of a network or indicate a congestion status of a network.

In an optional implementation, whether the mobility of the terminal device is low mobility or high mobility may be represented based on an average signal attenuation speed (which may be represented as an average signal attenuation slope) of the terminal device. For example, the average signal attenuation slope of −1 may be used as a reference value. When the average signal attenuation slope is greater than −1, that is, the RSRP of the received signal decreases slowly, and it may be considered that the mobility of the terminal device is low mobility. When the average signal attenuation slope is less than −1, that is, the RSRP of the received signal decreases rapidly, it may be considered that the mobility of the terminal device is high mobility. It should be noted that the foregoing example is merely a possible implementation. The mobility of the terminal device may alternatively be represented by another parameter. For example, the terminal device may determine the mobility by using a sensor on the terminal device, global positioning system (global positioning system, GPS) geographical location information, or the like. This is not limited in this application.

In an optional implementation, that the historical information indicates a non-congestion status of a network or indicates a congestion status of a network may be specifically: If the terminal device detects, based on the obtained historical information, that network congestion easily occurs at a point, it is considered that the historical information indicates a congestion status of a network. If the terminal device detects, based on the obtained historical information, that network congestion does not easily occur at a point, it is considered that the historical information indicates a non-congestion status of a network. The network congestion may be represented as follows: An RSRP of a network side device that is received by the terminal device is relatively high, but the terminal device cannot access a network, a data transmission rate cannot meet a requirement, or the like.

In a possible implementation, a specific method for determining, by the terminal device, a target PRACH resource selection manner may be: When a service type of a service currently processed by the terminal device is a latency-insensitive service type, or a type of a trigger event that currently triggers random access is a low-priority trigger event type, or a change rate at which a signal strength of a reference signal received by the terminal decreases within a specified time period is less than a specified change rate threshold (the change rate is an absolute value), or mobility of the terminal device is low mobility, or historical information obtained by the terminal device indicates a non-congestion status of a network, the terminal device determines, in the N SSBs, an SSB whose signal received power RSRP is the highest; and determine, based on a mapping relationship between an SSB and a PRACH resource, a PRACH resource corresponding to the SSB whose RSRP is the highest as the target PRACH resource.

According to the foregoing method, the terminal device can select a relatively good SSB, and then select a relatively good serving cell, thereby ensuring smooth progress of a service.

Figure 3:
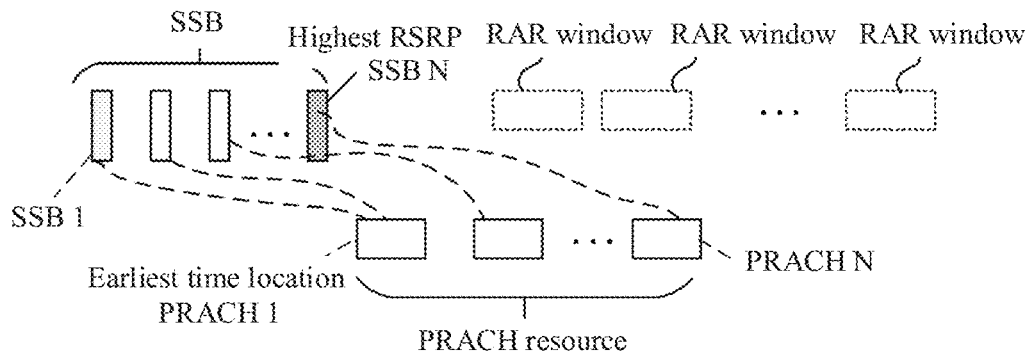
FIG. 3 is a schematic diagram of a time sequence relationship between an RAR window and a random access preamble sent by a terminal device according to this application.

For example, in a schematic diagram of a time sequence relationship between an RAR window and a random access preamble sent by the terminal device in FIG. 3, the N SSBs respectively correspond to N PRACH resources, and locations of a plurality of PRACH resources in the N PRACH resources may overlap or may not overlap. In the foregoing method, the terminal device first determines the SSB whose RSRP is the highest, for example, an SSB N shown in FIG. 3, and then determines a PRACH resource corresponding to the SSB N, for example, a PRACH N shown in FIG. 3. In other words, the PRACH N is the target PRACH resource.

In an optional implementation, when determining, in the N SSBs, the SSB whose signal received power RSRP is the highest, the terminal device may alternatively first sift, from the N SSBs, an SSB whose RSRP is greater than a specified threshold, and then determine, in sifted SSBs, an SSB whose RSRP is the highest.

In another possible implementation, a specific method for determining, by the terminal device, a target PRACH resource selection manner may be: When a service type of a service currently processed by the terminal device is a latency-sensitive service type, or a type of a trigger event that currently triggers random access is a high-priority trigger event type, or a change rate at which a signal strength of a reference signal received by the terminal decreases within a specified time period is greater than a specified change rate threshold (the change rate is an absolute value), or mobility of the terminal device is high mobility, or historical information obtained by the terminal device indicates a congestion status of a network, the terminal device selects, from the N SSBs, M SSBs whose RSRPs are greater than a specified threshold, where M is a positive integer less than or equal to N; determines, based on a mapping relationship between an SSB and a PRACH resource, M PRACH resources corresponding to the M SSBs; and determines, in the M PRACH resources, a PRACH resource whose time location is the earliest as the target PRACH resource.

According to the foregoing method, the terminal device selects a PRACH resource whose time location is the earliest, so that a random access process can be quickly completed subsequently, thereby reducing a random access latency.

Still using FIG. 3 as an example, in the foregoing method, the terminal device determines, in the M PRACH resources corresponding to the M SSBs, a PRACH resource whose time location is the earliest, for example, a PRACH 1 in FIG. 3. In other words, the PRACH 1 in FIG. 3 is the target PRACH resource.

Step 203: The terminal device selects, in the determined selection manner, the target PRACH resource from the N PRACH resources corresponding to the N SSBs.

In an optional implementation, after selecting the target PRACH resource, the terminal device determines an SSB corresponding to the target PRACH resource. In this way, a serving cell to be finally selected can be determined.

In an optional implementation, after selecting the target PRACH resource, the terminal device sends a random access preamble to the access device on the target PRACH resource. In this way, the terminal device can access the access device through a random access procedure, and subsequently can perform a service.

According to the PRACH resource selection method provided in this embodiment of this application, the terminal device receives the N synchronization signal blocks SSBs from the access device, and determines the target PRACH resource selection manner based on at least one of the service type, the type of the trigger event that triggers random access, the signal strength change status of the reference signal received by the terminal device, the mobility of the terminal device, and the historical information; and selects, in the determined selection manner, the target PRACH resource from the N PRACH resources corresponding to the N SSBs. According to the foregoing method, the terminal device may select an appropriate PRACH resource with reference to an actual situation, to meet a service requirement.

Figure 4:
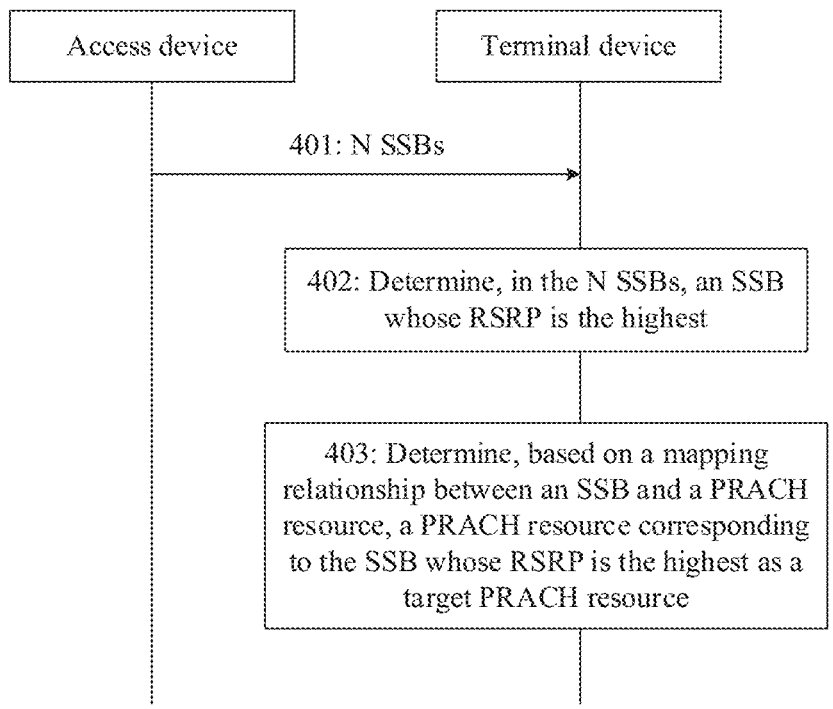
FIG. 4 is a flowchart of another PRACH resource selection method according to this application.

An embodiment of this application further provides another PRACH resource selection method that is applicable to the communications system shown in FIG. 1. As shown in FIG. 4, a specific procedure of the method includes the following steps.

Step 401: The terminal device receives N synchronization signal blocks SSBs from the access device, where N is an integer greater than 1.

Specifically, step 401 is similar to step 201 in the embodiment shown in FIG. 2, and step 401 and step 201 may be cross-referenced. Details are not described herein again.

Step 402: The terminal device determines, in the N SSBs, an SSB whose RSRP is the highest.

In an optional implementation, before determining, in the N SSBs, the SSB whose RSRP is the highest, the terminal device may determine that at least one of the following conditions is met: a service type of a currently processed service is a latency-insensitive service type; a type of a trigger event that currently triggers random access is a low-priority trigger event type; a change rate at which a signal strength of a reference signal received by the terminal device decreases within a specified time period is less than a specified change rate threshold (the change rate is an absolute value); mobility of the terminal device is low mobility; and historical information obtained by the terminal device indicates a non-congestion status of a network.

For related descriptions of the service type, the type of the trigger event that currently triggers random access, a signal strength change status of the reference signal received by the terminal device, the mobility of the terminal device, and the historical information, refer to related descriptions in step 202 in the embodiment shown in FIG. 2. Details are not described herein again.

In an optional implementation, when performing step 402, the terminal device may alternatively first sift, from the N SSBs, an SSB whose RSRP is greater than a specified threshold, and then determine, in selected SSBs, an SSB whose RSRP is the highest.

Step 403: The terminal device determines, based on a mapping relationship between an SSB and a PRACH resource, a PRACH resource corresponding to the SSB whose RSRP is the highest as a target PRACH resource.

For example, the SSB whose RSRP is the highest may be the SSB N shown in FIG. 3, and the target PRACH resource may be the PRACH N shown in FIG. 3.

In an optional implementation, after determining the target PRACH resource, the terminal device sends a random access preamble to the access device on the target PRACH resource. In this way, the terminal device can access the access device through a random access procedure, and subsequently can perform a service.

According to the PRACH resource selection method provided in this embodiment of this application, after receiving the N synchronization signal blocks SSBs from the access device, the terminal device determines, in the N SSBs, the SSB whose signal received power RSRP is the highest; and determines, based on the mapping relationship between an SSB and a PRACH resource, the PRACH resource corresponding to the SSB whose RSRP is the highest as the target PRACH resource. In this way, the terminal device can select an appropriate SSB and a target PRACH resource based on a requirement of the terminal device, thereby meet a service requirement.

Figure 5:
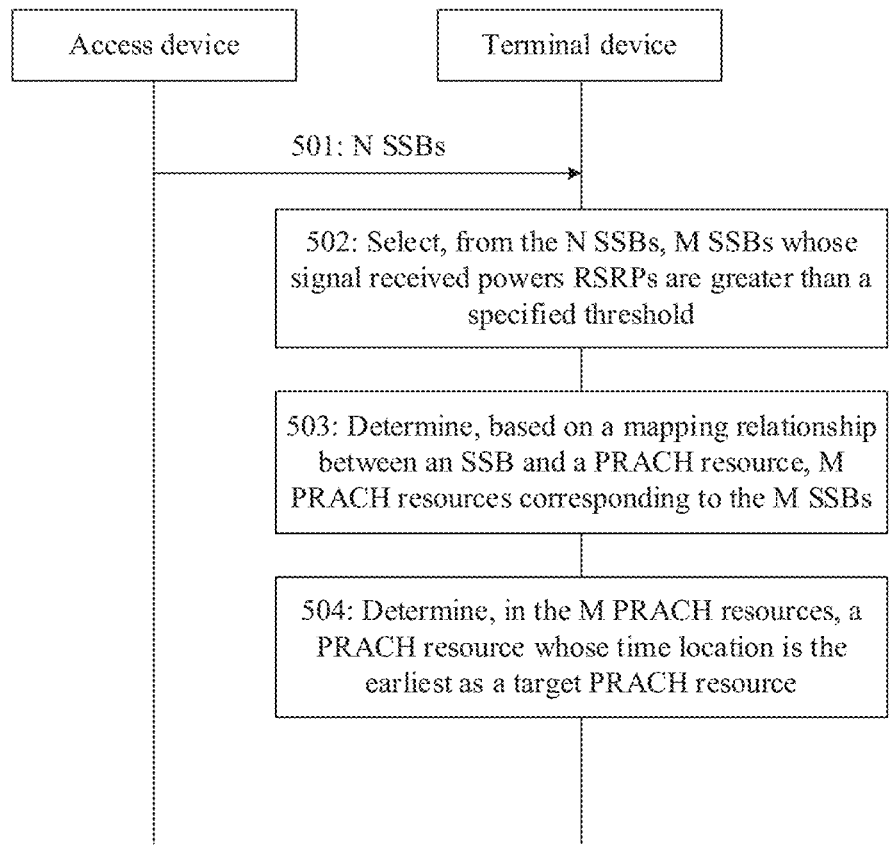
FIG. 5 is a flowchart of another PRACH resource selection method according to this application.

An embodiment of this application further provides another PRACH resource selection method that is applicable to the communications system shown in FIG. 1. As shown in FIG. 5, a specific procedure of the method includes the following steps.

Step 501: The terminal device receives N synchronization signal blocks SSBs from the access device, where N is an integer greater than 1.

Specifically, step 401 is similar to step 201 in the embodiment shown in FIG. 2, and step 401 and step 201 may be cross-referenced. Details are not described herein again.

Step 502: The terminal device selects, from the N SSBs, M SSBs whose signal received powers RSRPs are greater than a specified threshold, where M is a positive integer less than or equal to N.

In an optional implementation, before selecting the M SSBs from the N SSBs, the terminal device determines that at least one of the following conditions is met: a service type of a currently processed service is a latency-sensitive service type; a type of a trigger event that currently triggers random access is a high-priority trigger event type; a change rate at which a signal strength of a reference signal received by the terminal device decreases within a specified time period is greater than a specified change rate threshold (the change rate is an absolute value); mobility of the terminal device is high mobility; and historical information obtained by the terminal device indicates a congestion status of a network.

For related descriptions of the service type, the type of the trigger event that currently triggers random access, a signal strength change status of the reference signal received by the terminal device, the mobility of the terminal device, and the historical information, refer to related descriptions in step 202 in the embodiment shown in FIG. 2. Details are not described herein again.

Step 503: The terminal device determines, based on a mapping relationship between an SSB and a PRACH resource, M PRACH resources corresponding to the M SSBs.

Step 504: The terminal device determines, in the M PRACH resources, a PRACH resource whose time location is the earliest as a target PRACH resource.

For example, the target PRACH resource may be a PRACH 1 whose time location is the earliest shown in FIG. 3.

In an optional implementation, after determining the target PRACH resource, the terminal device sends a random access preamble to the access device on the target PRACH resource. In this way, the terminal device can access the access device through a random access procedure, and subsequently can perform a service.

In an optional implementation, after selecting the target PRACH resource, the terminal device determines an SSB corresponding to the target PRACH resource. In this way, a serving cell to be finally selected can be determined.

According to the PRACH resource selection method provided in this embodiment of this application, the terminal device receives the N synchronization signal blocks SSBs from the access device, selects, from the N SSBs, the M SSBs whose signal received powers RSRPs are greater than the specified threshold, determines, based on the mapping relationship between an SSB and a PRACH resource, the M PRACH resources corresponding to the M SSBs, and determines, in the M PRACH resources, the PRACH resource whose time location is the earliest as the target PRACH resource. In this way, the terminal device can subsequently quickly complete a random access process, thereby reducing a random access latency, and further meeting a service requirement.

Based on the foregoing embodiment, the terminal device may further select a PRACH resource by using the following method.

In an optional implementation, before selecting a PRACH resource, the terminal device may further first determine whether one or more of the following items are configured for the access device: a plurality of PRACH configuration periods (PRACH configuration period), whether a PRACH configuration period is relatively long, and whether a quantity of the PRACH configuration periods is relatively large. If one or more of the following items are configured for the access device: a plurality of PRACH configuration periods, a relatively long PRACH configuration period, and a relatively large quantity of PRACH configuration periods, causing an earliest time and a latest time of PRACH resources corresponding to the N SSBs to exceed a specified threshold (for example, 40 ms), the terminal device may select a PRACH resource whose time location is the earliest, and then determines a corresponding SSB; otherwise, the terminal device selects an SSB whose RSRP is the highest and then determines a corresponding PRACH resource.

In an optional implementation, alternatively, provided that the terminal device detects an SSB that meets an RSRP threshold, the terminal device can select a beam corresponding to the SSB and a PRACH resource corresponding to the SSB.

In an optional implementation, the terminal device may alternatively select, in any case, a PRACH resource with an earliest time location and an SSB corresponding to the PRACH resource from SSBs that meet an RSRP threshold condition.

Figure 6:
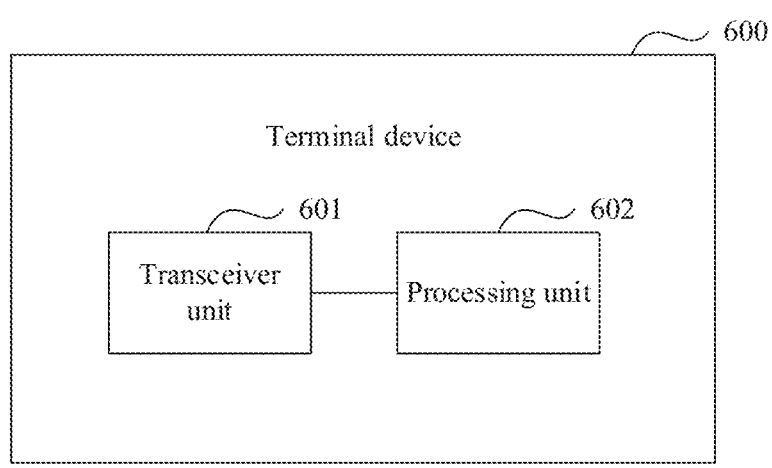
FIG. 6 is a schematic structural diagram of a terminal device according to this application.

Based on the foregoing embodiments, an embodiment of this application further provides a terminal device. The terminal device is applicable to the communications system shown in FIG. 1. Referring to FIG. 6, the terminal device 600 may include a transceiver unit 601 and a processing unit 602.

In an embodiment, the terminal device 600 shown in FIG. 6 may be configured to implement the PRACH resource selection method shown in FIG. 2. Details are as follows:

The transceiver unit 601 is configured to receive N synchronization signal blocks SSBs from an access device, where N is an integer greater than 1. The processing unit 602 is configured to: determine a target PRACH resource selection manner based on at least one of a service type, a type of a trigger event that triggers random access, a signal strength change status of a reference signal received by the terminal device, mobility of the terminal device, and historical information, and select, in the determined selection manner, a target PRACH resource from N PRACH resources corresponding to the N SSBs.

In a possible implementation, when determining the target PRACH resource selection manner, the processing unit 602 is specifically configured to: when a service type of a currently processed service is a latency-insensitive service type, or a type of a trigger event that currently triggers random access is a low-priority trigger event type, or a change rate at which a signal strength of a reference signal received by the terminal decreases within a specified time period is less than a specified change rate threshold (the change rate is an absolute value), or mobility of the terminal device is low mobility, or historical information obtained by the terminal device indicates a non-congestion situation of a network, the determined selection manner is: determine, in the N SSBs, an SSB whose signal received power RSRP is the highest; and determine, based on a mapping relationship between an SSB and a PRACH resource, a PRACH resource corresponding to the SSB whose RSRP is the highest as the target PRACH resource.

In another possible implementation, when determining the target PRACH resource selection manner, the processing unit 602 is specifically configured to: when a service type of a currently processed service is a latency-sensitive service type, or a type of a trigger event that currently triggers random access is a high-priority trigger event type, or a change rate at which a signal strength of a reference signal received by the terminal device decreases within a specified time period is greater than a specified change rate threshold (the change rate is an absolute value), or mobility of the terminal device is high mobility, or historical information obtained by the terminal device indicates a congestion status of a network, the determined selection manner is: select, from the N SSBs, M SSBs whose RSRPs are greater than a specified threshold, where M is a positive integer less than or equal to N; determine, based on a mapping relationship between an SSB and a PRACH resource, M PRACH resources corresponding to the M SSBs; and determine, in the M PRACH resources, a PRACH resource whose time location is the earliest as the target PRACH resource.

In an optional implementation, after selecting the target PRACH resource, the processing unit 602 may further determine an SSB corresponding to the target PRACH resource.

In an optional implementation, after selecting the target PRACH resource, the processing unit 602 may further use the transceiver unit 601 to send a random access preamble to the access device on the target PRACH resource.

In another embodiment, the terminal device 600 shown in FIG. 6 may be configured to implement the PRACH resource selection method shown in FIG. 4. Details are as follows:

The transceiver unit 601 is configured to receive N synchronization signal blocks SSBs from an access device, where N is an integer greater than 1. The processing unit 602 is configured to: determine, in the N SSBs, an SSB whose signal received power RSRP is the highest; and determine, based on a mapping relationship between an SSB and a PRACH resource, a PRACH resource corresponding to the SSB whose RSRP is the highest as the target PRACH resource.

In an optional implementation, before determining, in the N SSBs, the SSB whose RSRP is the highest, the processing unit 602 determines that at least one of the following conditions is met: a service type of a currently processed service is a latency-insensitive service type; a type of a trigger event that currently triggers random access is a low-priority trigger event type; a change rate at which a signal strength of a reference signal received by the terminal device decreases within a specified time period is less than a specified change rate threshold (the change rate is an absolute value); mobility of the terminal device is low mobility; and historical information obtained by the terminal device indicates a non-congestion status of a network.

In still another embodiment, the terminal device 600 shown in FIG. 6 may be configured to implement the PRACH resource selection method shown in FIG. 5. Details are as follows:

The transceiver unit 601 is configured to receive N synchronization signal blocks SSBs from an access device, where N is an integer greater than 1. The processing unit 602 is configured to: select, from the N SSBs, M SSBs whose signal received powers RSRPs are greater than a specified threshold, where M is a positive integer less than or equal to N; determine, based on a mapping relationship between an SSB and a PRACH resource, M PRACH resources corresponding to the M SSBs; and determine, in the M PRACH resources, a PRACH resource with an earliest time location as the target PRACH resource.

In an optional implementation, before selecting the M SSBs from the N SSBs, the processing unit 602 determines that at least one of the following conditions is met: a service type of a currently processed service is a latency-sensitive service type; a type of a trigger event that currently triggers random access is a high-priority trigger event type; a change rate at which a signal strength of a reference signal received by the terminal device decreases within a specified time period is greater than a specified change rate threshold (the change rate is an absolute value); mobility of the terminal device is high mobility; and historical information obtained by the terminal device indicates a congestion status of a network.

It should be noted that, in the embodiments of this application, division into the units is an example, and is merely logical function division. In actual implementation, another division manner may be used. Functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor (processor) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

Figure 7:
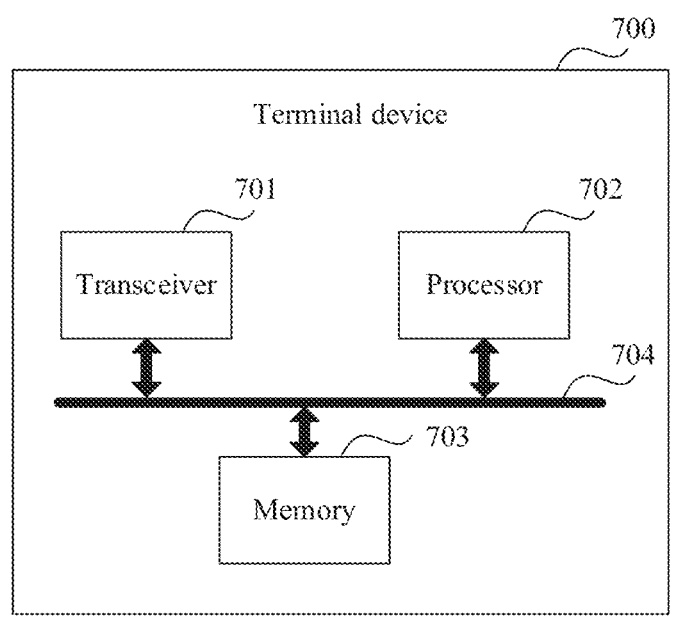
FIG. 7 is a structural diagram of a terminal device according to this application.

Based on the foregoing embodiments, an embodiment of this application further provides a terminal device. The terminal device is applicable to the communications system shown in FIG. 1. As shown in FIG. 7, the terminal device 700 may include a transceiver 701 and a processor 702, and optionally may further include a memory 703. The processor 702 may be a central processing unit (central processing unit, CPU), a network processor (network processor, NP), a combination of a CPU and an NP, or the like. The processor 702 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable logic gate array (field-programmable gate array, FPGA), generic array logic (generic array logic, GAL), or any combination thereof. The processor 702 may implement the foregoing functions by using hardware, or certainly by executing corresponding software by using hardware.

The transceiver 701 and the processor 702 are connected to each other. Optionally, the transceiver 701 and the processor 702 are connected to each other by using a bus 704. The bus 704 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one thick line is used to represent the bus in FIG. 7, but this does not mean that there is only one bus or only one type of bus.

In an optional implementation, the memory 703 is coupled to the processor 702, and is configured to store a program and the like. Specifically, the program may include program code, and the program code includes computer operation instructions. The memory 703 may include a RAM, or may include a non-volatile memory (non-volatile memory), for example, at least one magnetic disk memory. The processor 702 executes the application program stored in the memory 703, to implement a function of the network device, to implement the foregoing PRACH resource selection method.

In an embodiment, the terminal device 700 shown in FIG. 7 may be configured to perform operations of the terminal device in the embodiment shown in FIG. 2. Details are as follows:

The transceiver 701 is configured to receive N synchronization signal blocks SSBs from an access device, where N is an integer greater than 1. The processor 702 is configured to: determine a target PRACH resource selection manner based on at least one of a service type, a type of a trigger event that triggers random access, a signal strength change status of a reference signal received by the terminal device, mobility of the terminal device, and historical information, and select, in the determined selection manner, a target PRACH resource from N PRACH resources corresponding to the N SSBs.

The processor 702 is further configured to perform other operations of the terminal device in the embodiment shown in FIG. 2. For details, refer to the embodiment shown in FIG. 2. Details are not described herein again.

In another embodiment, the terminal device 700 shown in FIG. 7 may be configured to perform operations of the terminal device in the embodiment shown in FIG. 4. Details are as follows:

The transceiver 701 is configured to receive N synchronization signal blocks SSBs from an access device, where N is an integer greater than 1. The processor 702 is configured to: determine, in the N SSBs, an SSB whose signal received power RSRP is the highest; and determine, based on a mapping relationship between an SSB and a PRACH resource, a PRACH resource corresponding to the SSB whose RSRP is the highest as the target PRACH resource.

The processor 702 is further configured to perform other operations of the terminal device in the embodiment shown in FIG. 4. For details, refer to the embodiment shown in FIG. 4. Details are not described herein again.

In still another embodiment, the terminal device 700 shown in FIG. 7 may be configured to perform operations of the terminal device in the embodiment shown in FIG. 5. Details are as follows:

The transceiver 701 is configured to receive N synchronization signal blocks SSBs from an access device, where N is an integer greater than 1. The processor 702 is configured to: select, from the N SSBs, M SSBs whose signal received powers RSRPs are greater than a specified threshold, where M is a positive integer less than or equal to N; determine, based on a mapping relationship between an SSB and a PRACH resource, M PRACH resources corresponding to the M SSBs; and determine, in the M PRACH resources, a PRACH resource with an earliest time location as the target PRACH resource.

The processor 702 is further configured to perform other operations of the terminal device in the embodiment shown in FIG. 5. For details, refer to the embodiment shown in FIG. 5. Details are not described herein again.

In conclusion, the embodiments of this application provide a PRACH resource selection method and an apparatus. A terminal device may select an appropriate PRACH resource with reference to an actual situation, to meet a service requirement.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

It is clear that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method comprising:
   receiving synchronization signal blocks (SSBs) from an access device;
   determining a target physical random access channel (PRACH) resource selection manner based on at least one of a service type, a type of a trigger event that triggers random access, a signal strength change status of a reference signal received by a terminal device, mobility of the terminal device, or historical information obtained by the terminal device, wherein the historical information comprises an indication of a congestion status of a network or a non-congestion status of the network, and wherein determining the target PRACH resource selection manner further comprises determining the target PRACH resource selection manner when the service type of a service currently processed by the terminal device is a latency-insensitive service type, the type of the trigger event that currently triggers random access is a low-priority trigger event type, a change rate at which a signal strength of the reference signal received by the terminal device changes within a specified time period is less than a specified change rate threshold, the mobility of the terminal device is low mobility, or the historical information obtained by the terminal device indicates the non-congestion status of the network;
   mapping relationships between the SSBs and PRACH resources; and
   selecting, using the target PRACH resource selection manner, a target PRACH resource from the PRACH resources corresponding to the SSBs based on mapping relationships between the SSBs and the PRACH resources, wherein selecting the target PRACH resource using the target PRACH resource selection manner further comprises:
      determining a first SSB of the SSBs whose reference signal received power (RSRP) is the highest; and
      determining, based on the mapping relationships between the SSBs and the PRACH resources, one of the PRACH resources corresponding to the first SSB as the target PRACH resource.

2. The method of claim 1, wherein after selecting the target PRACH resource, the method further comprises sending a random access preamble to the access device on the target PRACH resource.

3. The method of claim 1, wherein the target PRACH resource selection manner is determined based on the service type.

4. The method of claim 1, wherein the target PRACH resource selection manner is determined based on the type of the trigger event that triggers random access.

5. The method of claim 1, wherein the target PRACH resource selection manner is determined based on the signal strength change status of the reference signal received by the terminal device.

6. The method of claim 1, wherein the target PRACH resource selection manner is determined based on the mobility of the terminal device.

7. The method of claim 1, wherein the target PRACH resource selection manner is determined based on the historical information.

8. The method of claim 1, wherein the target PRACH resource selection manner is determined when the service type of the service currently processed by the terminal device is the latency-insensitive service type.

9. The method of claim 1, wherein the target PRACH resource selection manner is determined when the type of the trigger event that currently triggers random access is the low-priority trigger event type.

10. The method of claim 1, wherein the target PRACH resource selection manner is determined when the change rate at which the signal strength of the reference signal received by the terminal device changes within the specified time period is less than the specified change rate threshold.

11. The method of claim 1, wherein the target PRACH resource selection manner is determined when the mobility of the terminal device is the low mobility.

12. The method of claim 1, wherein the target PRACH resource selection manner is determined when the historical information obtained by the terminal device indicates the non-congestion status of the network.

13. A terminal device, comprising:
a transceiver configured to receive synchronization signal blocks (SSBs) from an access device; and
a processor coupled to the transceiver and configured to:
determine a target physical random access channel (PRACH) resource selection manner based on at least one of a service type, a type of a trigger event that triggers random access, a signal strength change status of a reference signal received by the terminal device, mobility of the terminal device, or historical information obtained by the terminal device, wherein the historical information comprises an indication of a congestion status of a network or a non-congestion status of the network, and wherein the processor is further configured to determine the target PRACH resource selection manner when the service type of a service currently processed by the terminal device is a latency-insensitive service type, the type of the trigger event that currently triggers random access is a low-priority trigger event type, a change rate at which a signal strength of the reference signal received by the terminal device changes within a specified time period is less than a specified change rate threshold, the mobility of the terminal device is low mobility, or the historical information obtained by the terminal device indicates the non-congestion status of the network;
map relationships between the SSBs and PRACH resources; and
select, using the target PRACH resource selection manner, a target PRACH resource from the PRACH resources corresponding to the SSBs based on mapping relationships between the SSBs and the PRACH resources, wherein the processor is further configured to select the target PRACH resource using the target PRACH resource selection manner by:
determining a first SSB of the SSBs whose reference signal received power (RSRP) is the highest; and
determining, based on the mapping relationships between the SSBs and the PRACH resources, one of the PRACH resources corresponding to the first SSB as the target PRACH resource.

14. The terminal device of claim 13, wherein the processor is further configured to send, using the transceiver, a random access preamble to the access device on the target PRACH resource after selecting the target PRACH resource.

15. The terminal device of claim 13, wherein the target PRACH resource selection manner is determined based on the service type.

16. The terminal device of claim 13, wherein the target PRACH resource selection manner is determined based on the type of the trigger event that triggers random access.

17. The terminal device of claim 13, wherein the target PRACH resource selection manner is determined based on the signal strength change status of the reference signal received by the terminal device.

18. The terminal device of claim 13, wherein the target PRACH resource selection manner is determined based on the mobility of the terminal device.

19. The terminal device of claim 13, wherein the target PRACH resource selection manner is determined based on the historical information.

20. A computer program product comprising instructions that are stored on a non-transitory computer-readable medium and that, when executed by a processor, cause a terminal device to:
receive synchronization signal blocks (SSBs) from an access device;
determine a target physical random access channel (PRACH) resource selection manner based on at least one of a service type, a type of a trigger event that triggers random access, a signal strength change status of a reference signal received by the terminal device, mobility of the terminal device, or historical information obtained by the terminal device, wherein the historical information comprises an indication of a congestion status of a network or a non-congestion status of the network, and wherein the instructions further cause the terminal device to determine the target PRACH resource selection manner when the service type of a service currently processed by the terminal device is a latency-sensitive service type, the type of the trigger event that currently triggers random access is a high-priority trigger event type, a change rate at which a signal strength of the reference signal received by the terminal device changes within a specified time period is greater than a specified change rate threshold, the mobility of the terminal device is high mobility, or the historical information obtained by the terminal device indicates the congestion status of the network;
map relationships between the SSBs and PRACH resources; and resources, and
select, using the PRACH resource selection manner, a target PRACH resource from the PRACH resources corresponding to the SSBs based on mapping relationships between the SSBs and the PRACH resources, wherein the instructions further cause the terminal device to select the target PRACH resource using the target PRACH resource selection manner by:

selecting, from the SSBs, first SSBs whose reference signal received powers (RSRPs) are greater than a specified threshold;

determining, based on the mapping relationships between the SSBs and the PRACH resources, first PRACH resources corresponding to the first SSBs; and determining, from the first PRACH resources, one of the PRACH resources whose time location is the earliest as the target PRACH resource.

21. The computer program product of claim 20, wherein the instructions further cause the terminal device to determine one of the first SSBs corresponding to the target PRACH resource.

22. The computer program product of claim 20, wherein the instructions further cause the terminal device to send a random access preamble to the access device on the target PRACH resource.

23. The computer program product of claim 20, wherein the target PRACH resource selection manner is determined based on the service type.

24. The computer program product of claim 20, wherein the target PRACH resource selection manner is determined based on the type of the trigger event that triggers random access.

25. The computer program product of claim 20, wherein the target PRACH resource selection manner is determined based on the signal strength change status of the reference signal received by the terminal device.

26. The computer program product of claim 20, wherein the target PRACH resource selection manner is determined based on the mobility of the terminal device.

27. The computer program product of claim 20, wherein the target PRACH resource selection manner is determined based on the historical information.

28. The computer program product of claim 20, wherein the instructions further cause the terminal device to determine the target PRACH resource selection manner when the service type of the service currently processed by the terminal device is the latency-sensitive service type.

29. The computer program product of claim 20, wherein the SSBs from the access device are received from different directions.

30. The computer program product of claim 29, wherein the access device comprises a Fifth Generation (5G) access device.

* * * * *

UNITED STATES PATENT AND TRADEMARK OFFICE
CERTIFICATE OF CORRECTION

PATENT NO. : 12,058,607 B2
APPLICATION NO. : 17/298399
DATED : August 6, 2024
INVENTOR(S) : Yongbo Zeng et al.

Page 1 of 1

It is certified that error appears in the above-identified patent and that said Letters Patent is hereby corrected as shown below:

In the Claims

Claim 20, Column 18, Line 60 "resources; and resources, and" should read "resources; and"

Signed and Sealed this
Twenty-fourth Day of September, 2024

Katherine Kelly Vidal
*Director of the United States Patent and Trademark Office*